United States Patent

Van Bebber et al.

[11] Patent Number: 5,870,833
[45] Date of Patent: Feb. 16, 1999

[54] BALANCING CONTAINER FINISH MEASURING DEVICE

[75] Inventors: Frederick Van Bebber, deceased, late of Tracy, by Patricia Van Bebber, legal representative; John F. Breznock, Pleasanton; Terry L. Calhoun, Oakley; Ronald E. Heiskell, Tracy; Ezra A. Theys, San Mateo, all of Calif.

[73] Assignee: Clorox Company, Oakland, Calif.

[21] Appl. No.: 907,172

[22] Filed: Aug. 6, 1997

[51] Int. Cl.[6] .................................................. G01B 5/213
[52] U.S. Cl. ............................................. 33/554; 33/555.3
[58] Field of Search .............................. 33/549, 550, 551, 33/553, 554, 555.3, 832, 833, 792, 797

[56] References Cited

U.S. PATENT DOCUMENTS

| | | |
|---|---|---|
| 2,939,220 | 6/1960 | Croshier et al. . |
| 3,073,034 | 1/1963 | Antoszewski . |
| 3,771,650 | 11/1973 | Henderson et al. . |
| 3,981,180 | 9/1976 | Lovalenti et al. . |
| 4,135,306 | 1/1979 | Hannon . |
| 4,419,824 | 12/1983 | Oberhans . |
| 4,480,412 | 11/1984 | Shank et al. . |
| 4,550,506 | 11/1985 | Katayama . |
| 4,641,437 | 2/1987 | Willis . |
| 4,862,596 | 9/1989 | Iino et al. . |
| 4,876,800 | 10/1989 | Pekar et al. . |
| 4,936,018 | 6/1990 | Robinson et al. . |
| 5,088,207 | 2/1992 | Betsill et al. . |
| 5,099,585 | 3/1992 | Liskow . |
| 5,276,971 | 1/1994 | Brewster . |
| 5,313,714 | 5/1994 | Nakao . |

*Primary Examiner*—Joseph L. Felber
*Attorney, Agent, or Firm*—Burns, Doane, Swecker and Mathis LLP

[57] ABSTRACT

A container measuring device for measuring minimum and maximum diameters and the ovality of a container finish includes a seat for receiving the container finish and a gauge for measuring the minimum and maximum diameters. The measuring device is balanced on the container with the container finish received in the seat and the measuring device is then rotated to determine the dimensions of the container finish. An adjustable counterweight may be used to balance the measuring device on the container finish. Preferably, the minimum and maximum diameters are recorded by the gauge and transmitted from the gauge to a computer for a determination of whether the container finish dimensions fall within a predetermined tolerance range.

20 Claims, 12 Drawing Sheets

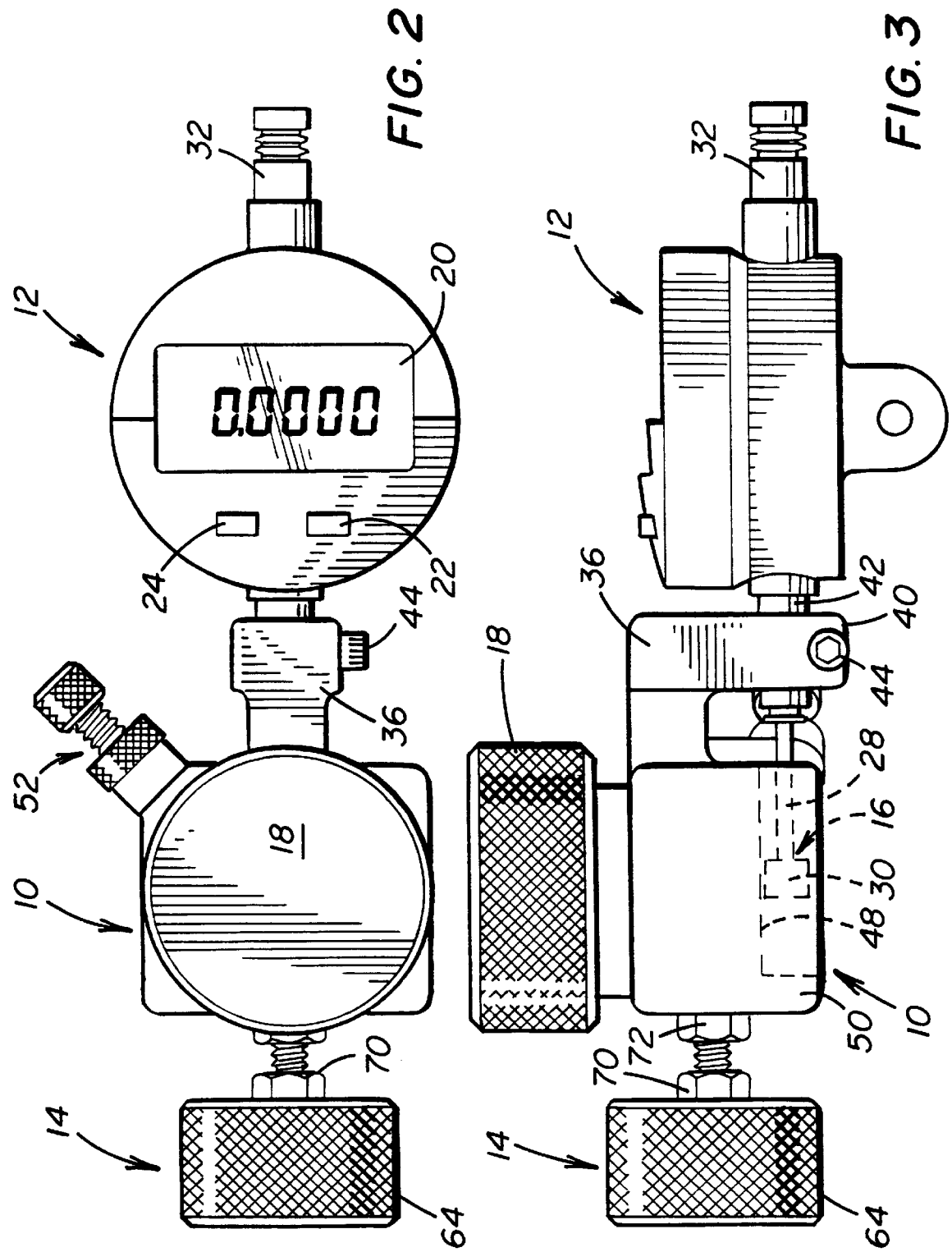

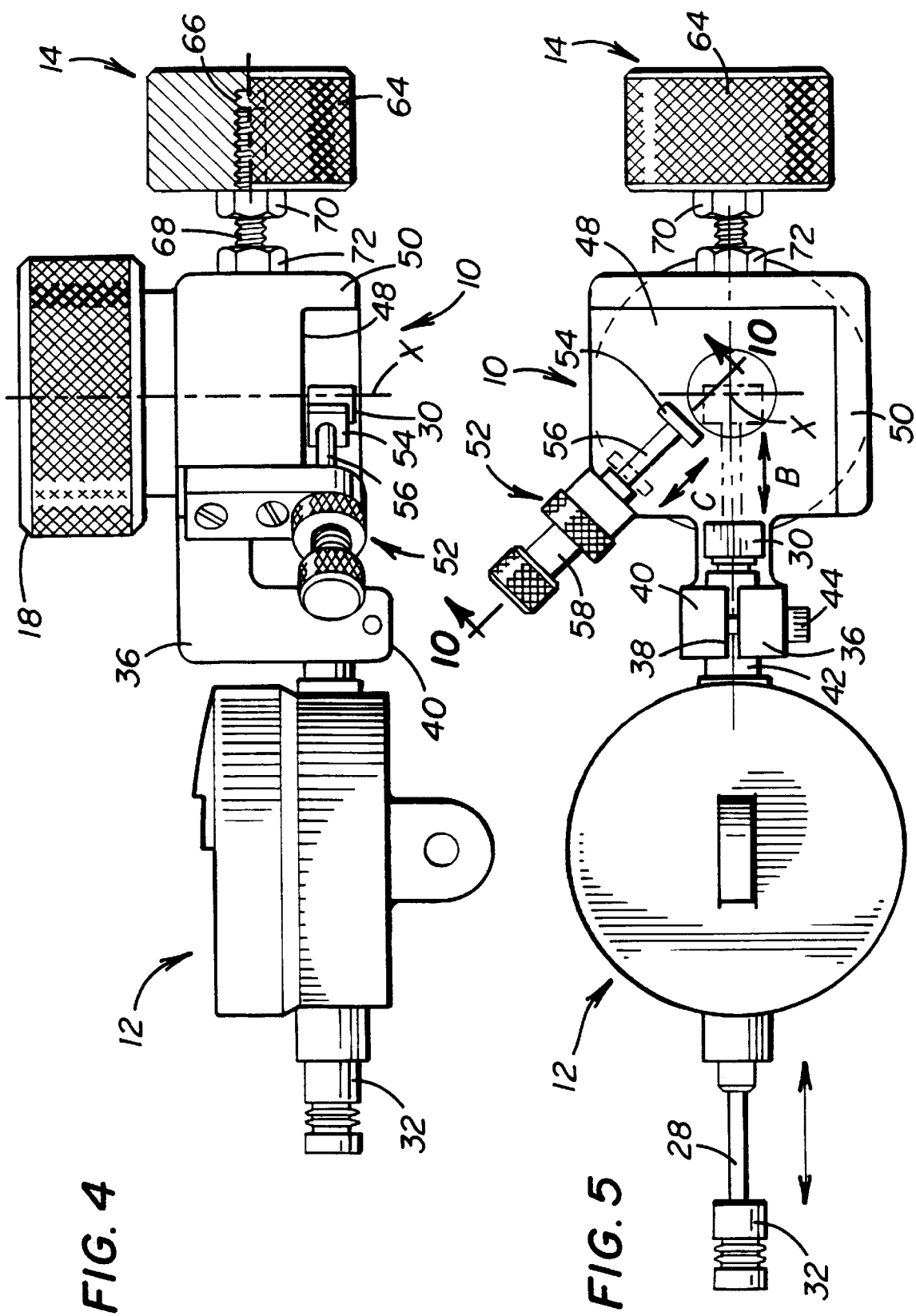

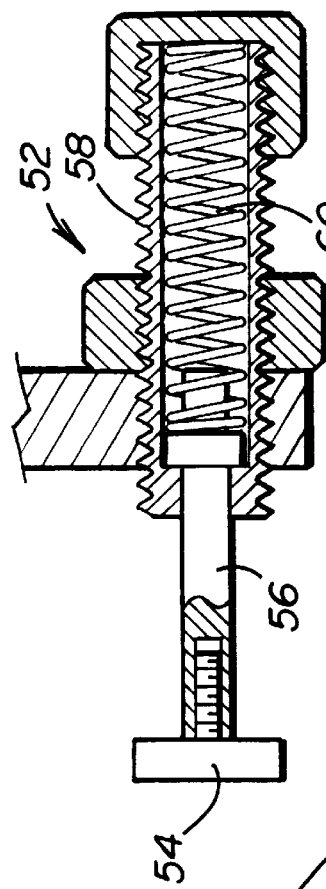
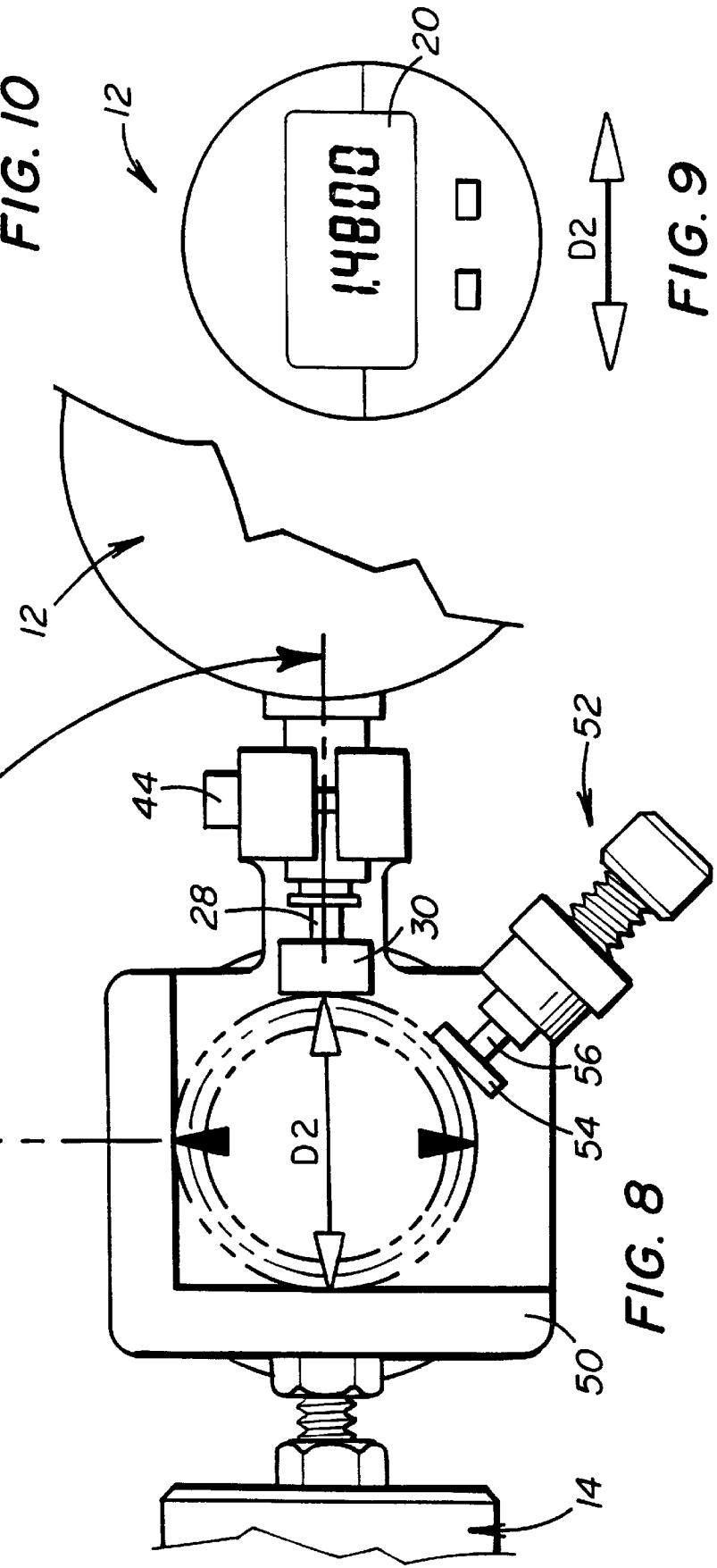

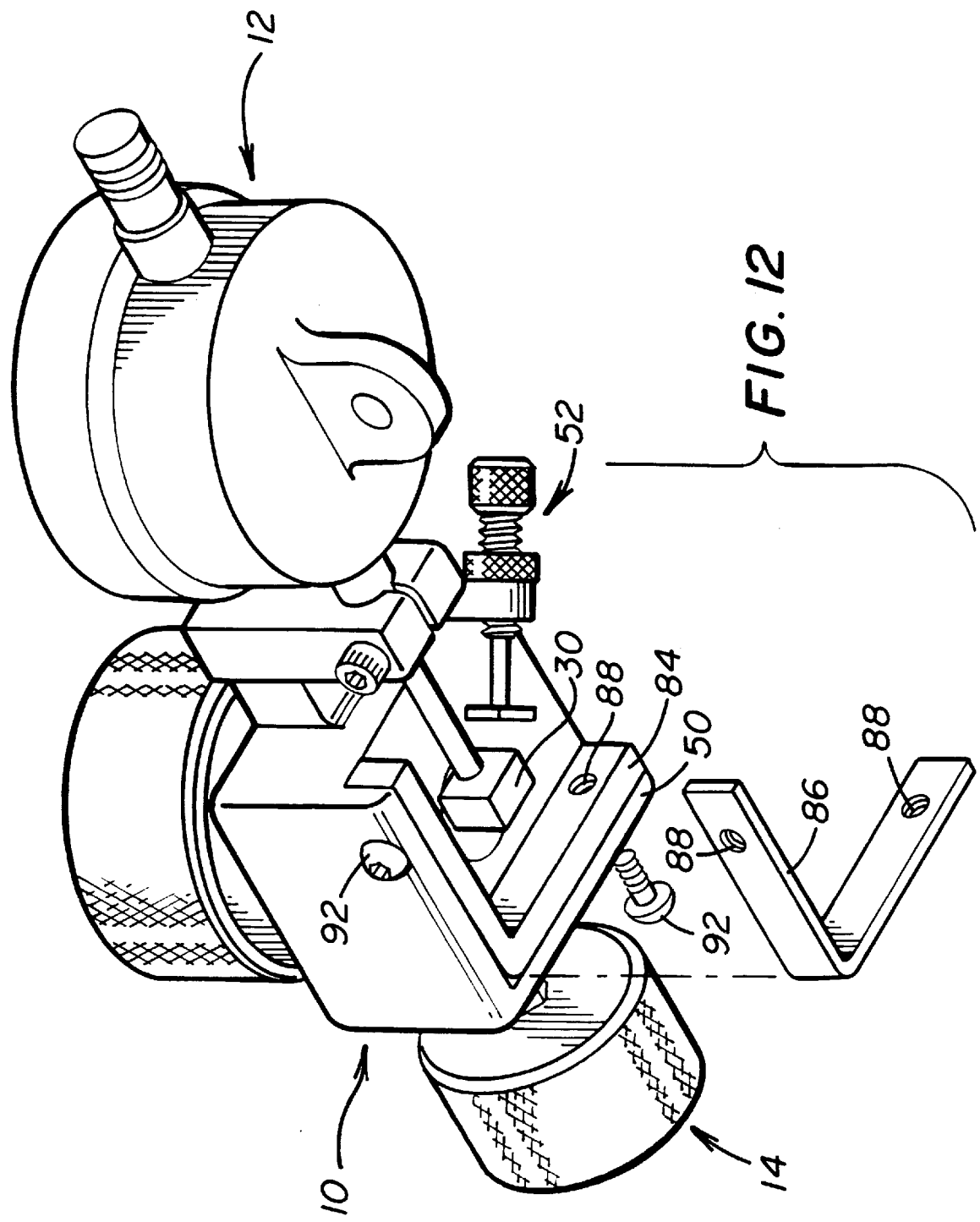

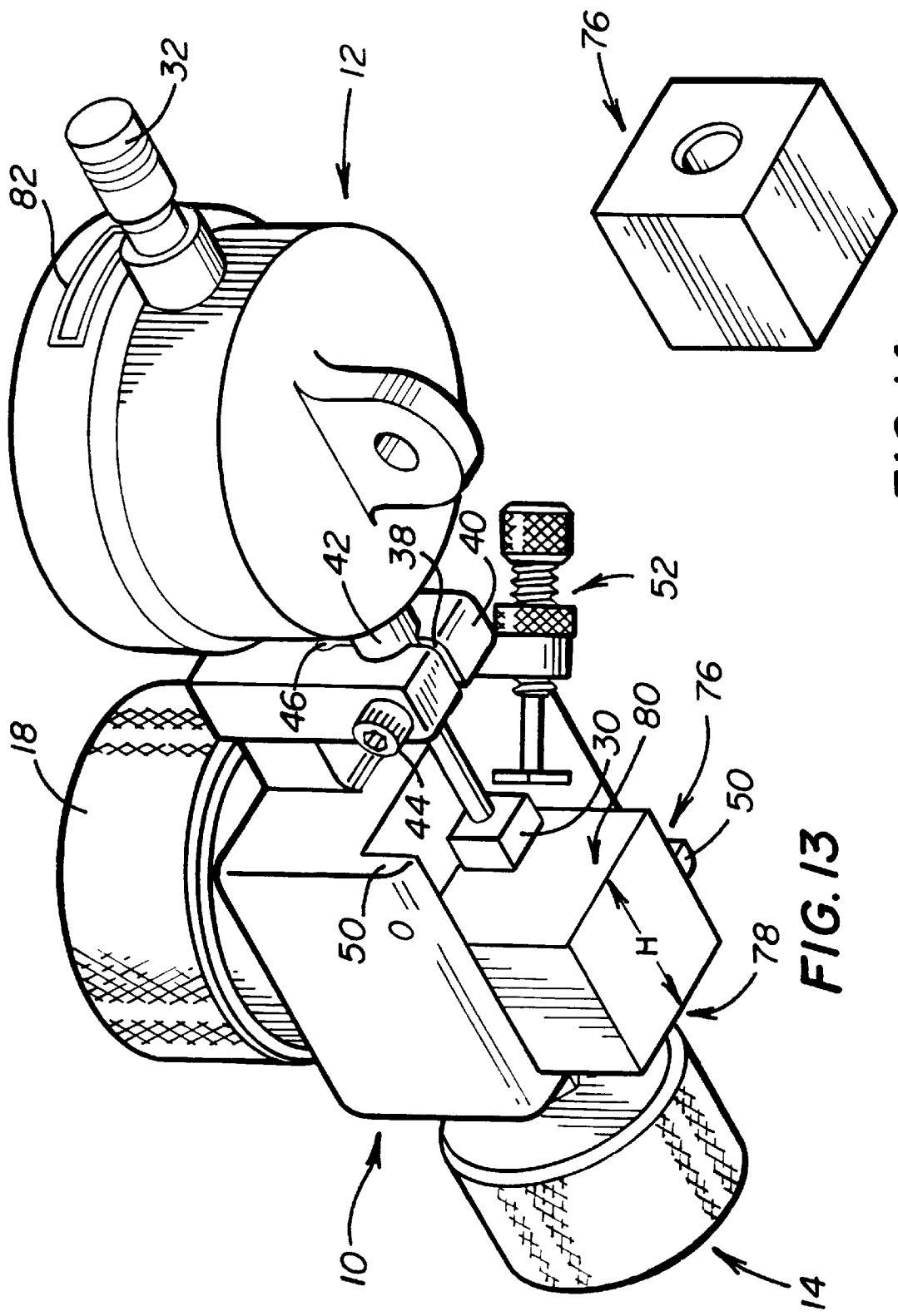

BALANCING CONTAINER FINISH MEASURING DEVICE

BACKGROUND OF THE INVENTION

1. Field of the Invention

The invention relates to a device for measuring dimensions of containers. More particularly, the invention relates to a container finish measuring device for measuring thread dimensions and ovality of a container finish to determine whether the finish is within a predetermined tolerance limit which will result in a liquid tight seal between the container finish and cap.

2. Brief Description of the Prior Art

In the manufacture of containers, certain dimensions are required to be within predetermined tolerance limits in order for the containers to function properly. In particular, the upper surface of the container, commonly known as the finish, must be maintained within certain manufacturing tolerances in order to provide adequate cap retention for a liquid tight seal to be formed between the container finish and the container cap.

Variations in the configuration of containers, particularly plastic containers, may occur during molding or trimming operations due to many factors, including differences in the molds used to form the containers, shrinkage of the containers after molding, materials used, curing temperatures, and trimming operations. One particular source of warping or ovalization of a container finish is the trimming operation. The container "finish" includes at least the neck, threads, rim, and top surface of a container. In particular, once the bottle or container has been molded, a trimming machine is used to trim flash from the finish of the container. While the flash is being trimmed from the finish, the bottle is held in place by a clamp received around and engaging the finish. Because the container is still warm during trimming, distortion or warping of the finish may be caused by the clamping force used to hold the container.

In order to determine whether containers which are being produced are within predetermined dimensional tolerances, generally a sampling of the containers being produced is measured to determine actual dimensions and ovality. Ovality is the difference between the minimum and maximum diameters of the finish. For containers which will hold fluids, including consumer products such as detergents and bleaches, it is important that the finish of the container be within the predetermined dimensional tolerances so that a cap will be retained properly on the finish and leaks will be prevented.

A bottle finish having threads for retaining a cap includes a T-dimension and an E-dimension. The T-dimension of the finish is the outside major diameter of the threads. The E-dimension is the minor outside wall diameter of the finish at the base of the threads. Generally, a bottle is measured by using calipers to determine the T-dimension of the finish. The T-dimension is measured at a first location along the mold parting line of the bottle, and also, at a second location along a line which is 90 degrees to the mold parting line. These two diameters of the finish are then used to determine the ovality of the bottle finish by subtracting the smaller dimension from the larger. However, these measurements will not give a true ovality of the finish because the two dimensions measured may not be the true minimum and maximum dimensions of the finish.

In order to determine a more accurate ovality, it would be desirable to take a large number of measurements at different positions around the diameter of the finish so that true minimum and maximum dimensions can be determined for calculation of ovality. However, taking a large number of dimensional readings with a caliper to determine an accurate ovality is time intensive.

In addition, the dimensions of a container finish as determined by manual measurement with a caliper will include inaccuracies which vary depending on the expertise of a particular user. The inaccuracies occur due to the manual placement of the caliper, variations in the manual force applied to the caliper, and the caliper blades cutting into the soft material of the bottle finish, such as when the bottle is made of a blown thermoplastic.

As an alternative to manual measurement with a caliper, container finishes may also be measured by an optical comparator. The optical comparator takes an enlarged shadowgraph of the bottle finish to provide a highly accurate measurement of the finish diameter. However, optical comparators are quite expensive and are generally not available at the location where the bottles are made. Therefore, when using an optical comparator, bottles often must be shipped off to a laboratory for measurement, providing a very delayed determination of dimensional tolerances. As a result, a large number of reject bottles may be made before the error is corrected by adjustments to the blow molding and/or trimming processes.

In addition, the optical comparator measures only one dimension of the finish at a time. Thus, as with the manual measurement of the finish with calipers, the bottle must be rotated and remeasured at many locations to determine ovality.

In view of the above drawbacks of the known methods for measuring thread dimensions and ovality of a container finish, it would be desirable to provide a measuring device for accurately measuring the true ovality of a container finish rapidly and with minimal user error.

One type of measuring device which has been proposed for measuring dimensional tolerances of a can includes a base into which the can is placed and the can is then rotated to measure a container dimension. However, this type of device into which a can is placed and then rotated cannot be properly used for a container having a non-symmetrical shape. For example, if a container having an offset finish is set in a device of this type, the container cannot be balanced for rotation within the device. An example of such a measuring device is described in U.S. Pat. No. 5,313,714.

Accordingly, it would be desirable to provide a portable container measuring device which does not require that the container be balanced in the device for measurement. It would also be desirable to provide a measuring device which measures the true maximum and minimum dimensions of a container finish.

SUMMARY OF THE INVENTION

The present invention addresses the drawbacks of the prior art by providing a container finish measuring device which is balanced on top of the container finish and rotated to measure the true maximum and minimum dimensions of the container finish as well as the ovality.

In accordance with one aspect of the present invention, a container finish measuring device includes a seat receivable on a container finish and a gauge. The seat includes a support surface, two fixed contact surfaces, and a movable contact surface. The gauge is connected to the movable contact surface for determining a minimum diameter and a maximum diameter of the container finish depending on motion of the movable contact surface. A counterweight is connected to the seat and arranged to balance a weight of the container finish measuring device on the container finish and allow rotation of the measuring device on the finish to measure the minimum diameter and maximum diameter.

According to a further aspect of the invention, a bottle neck measuring device is provided for measuring minimum and maximum diameters of a bottle neck to assure cap retention and a leak-proof seal between the bottle neck and a cap. The measuring device includes a gauge for measuring the minimum and maximum diameters of the bottle neck, and a measuring device body having the gauge attached thereto. The measuring device body includes a bottle neck receiving seat for receiving the bottle neck. The measuring device body is arranged such that when the bottle neck receiving seat is positioned on the bottle neck, the measuring device body is balanced on the bottle neck and is rotatable about the bottle neck for measurement of the minimum and maximum diameters.

In accordance with an additional aspect of the invention, a method of measuring a minimum diameter and a maximum diameter of a bottle finish includes balancing a measuring device on the bottle finish, rotating the measuring device at least 180 degrees while the measuring device is balanced on the bottle finish, and reading the minimum diameter and the maximum diameter of the bottle finish from the measuring device. The ovality of the bottle finish may also be measured.

BRIEF DESCRIPTION OF THE DRAWINGS

The foregoing and other objects, features, and advantages of the present invention will be more readily understood upon reading the following detailed description in conjunction with the drawings in which:

FIG. 2 is a top view of the measuring device;

FIG. 3 is a first side view of the measuring device;

FIG. 4 is a second side view of the measuring device with the counterweight partially in cross section;

FIG. 5 is a bottom view of the measuring device with the actuator in a retracted position and the piston in an extended position;

FIG. 8 is an enlarged bottom view of a portion of the measuring device showing the measurement of a second dimension of the bottle finish with the device rotated 90 degrees with respect to the position of the device in FIG. 6;

FIG. 9 is a top view of the gauge indicating a reading of the second dimension;

FIG. 10 is a cross-sectional view of the spring-loaded piston taken along line 10—10 of FIG. 5;

FIG. 12 is a bottom perspective view of the measuring device of FIG. 1 including bottle finish size adjustment members;

FIG. 13 is a bottom perspective view of the measuring device being calibrated;

FIG. 14 is a perspective view of a calibration block;

DETAILED DESCRIPTION OF THE PREFERRED EMBODIMENTS

Figure 1:
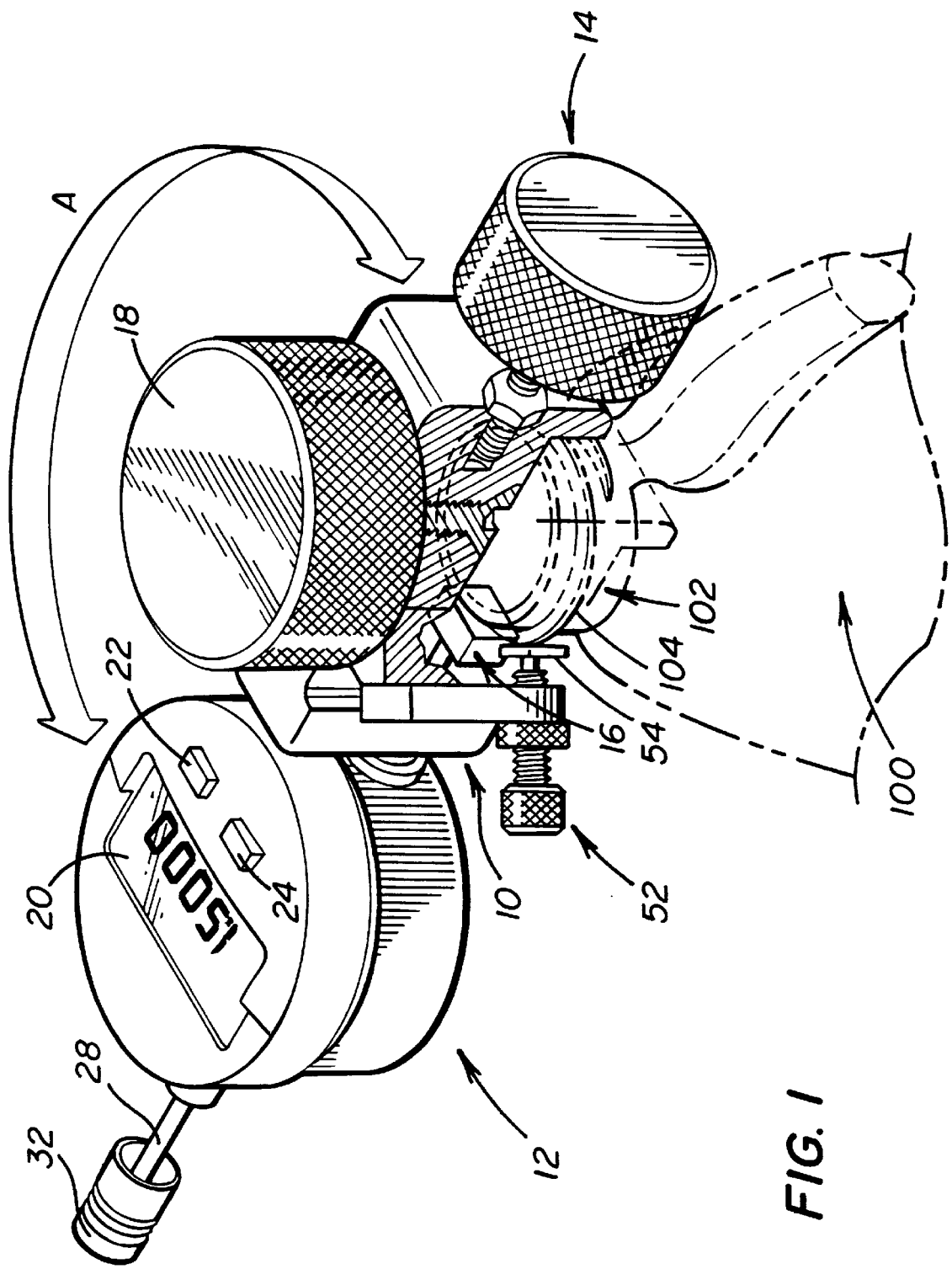
FIG. 1 is a perspective view of the measuring device of the present invention mounted on a bottle finish with a portion of the measuring device cut away to view the measuring device actuator.
Figure 7:
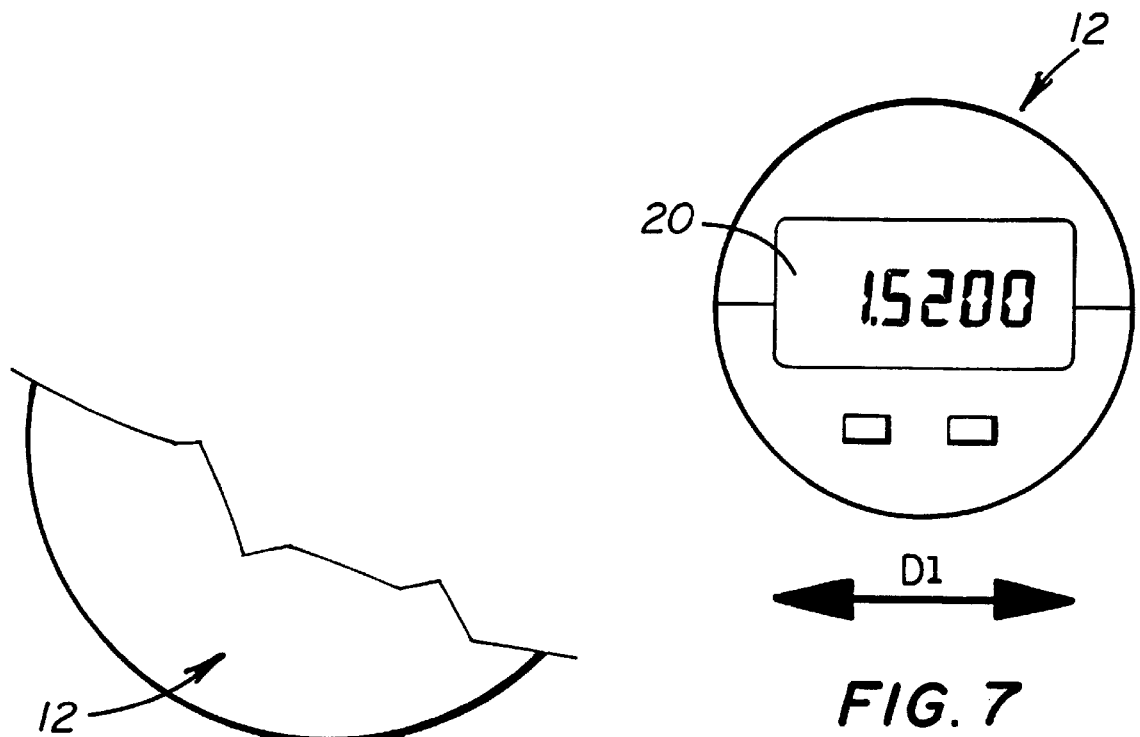
FIG. 7 is a top view of the gauge indicating a reading of the first dimension.

A container measuring device for measuring minimum and maximum diameters of a container finish is shown in FIG. 1. The measuring device is balanced on the container 100 and is rotated to measure the container finish. The measurement of the container finish 102 to determine whether the minimum and maximum diameters of the finish fall within a predetermined tolerance range is important to ensure proper cap retention and prevent leaks once the container has been filled and sealed. The measuring device of the present invention provides an easy to operate and accurate means to measure true minimum and maximum diameters of the container finish.

The container measuring device includes a central seat 10 for receiving the container finish 102, a gauge 12 extending from the central seat on a first side, and a counterweight 14 extending from the central seat on a second side. The measuring device is positioned over the finish 102 of the container 100 such that an actuator 16 of the gauge 12 extends to the bottle neck receiving seat 10 and contacts a thread 104 of the finish 102. The measuring device also includes a knob 18 positioned on top of the seat 10 and generally centered over the seat. Once the measuring device has been placed on the finish 102 of the container with the actuator 16 in contact with a thread 104, the entire measuring device is rotated 360 degrees by the knob 18 as indicated by the arrow A. As the measuring device is rotated, the gauge 12 records the minimum and maximum diameters of the bottle finish as well as the ovality by displacement of the actuator 16.

As shown in the top view of FIG. 2, the gauge 12 is provided with an upper face having a digital display 20, and two or more control buttons 22, 24. The control buttons 22, 24 are used to control the gauge display. For example, the buttons may include an on/off button, a set or zero button to calibrate the gauge, and/or a mode button to change the measurement mode between different units such as millimeters and inches. Preferably, the gauge will hold both a minimum and a maximum measurement as the gauge is rotated to facilitate reading of the gauge. Alternatively, a gauge may be used without a memory feature and the minimum and maximum dimensions may be read off the digital display by a user as the measuring device is rotated. Two examples of gauges which may be used in the present invention are the Digico 1, made by TESA of Switzerland, and the Ultra Digit Mark V, made by Sylvac of Switzerland.

As shown in FIGS. 3 and 5, the actuator 16 includes an actuator rod 28 extending through a body of the gauge 12 and having a first end with a pad 30 for engaging the finish of the container 100, and a second end having a stop 32. The actuator rod 28 is biased by a spring, or other retractable biasing means, which is located inside the gauge and is not shown, toward the position illustrated in FIG. 3 in which the first end or pad end 30 of the actuator rod is fully extended from the gauge 12.

Figure 11:
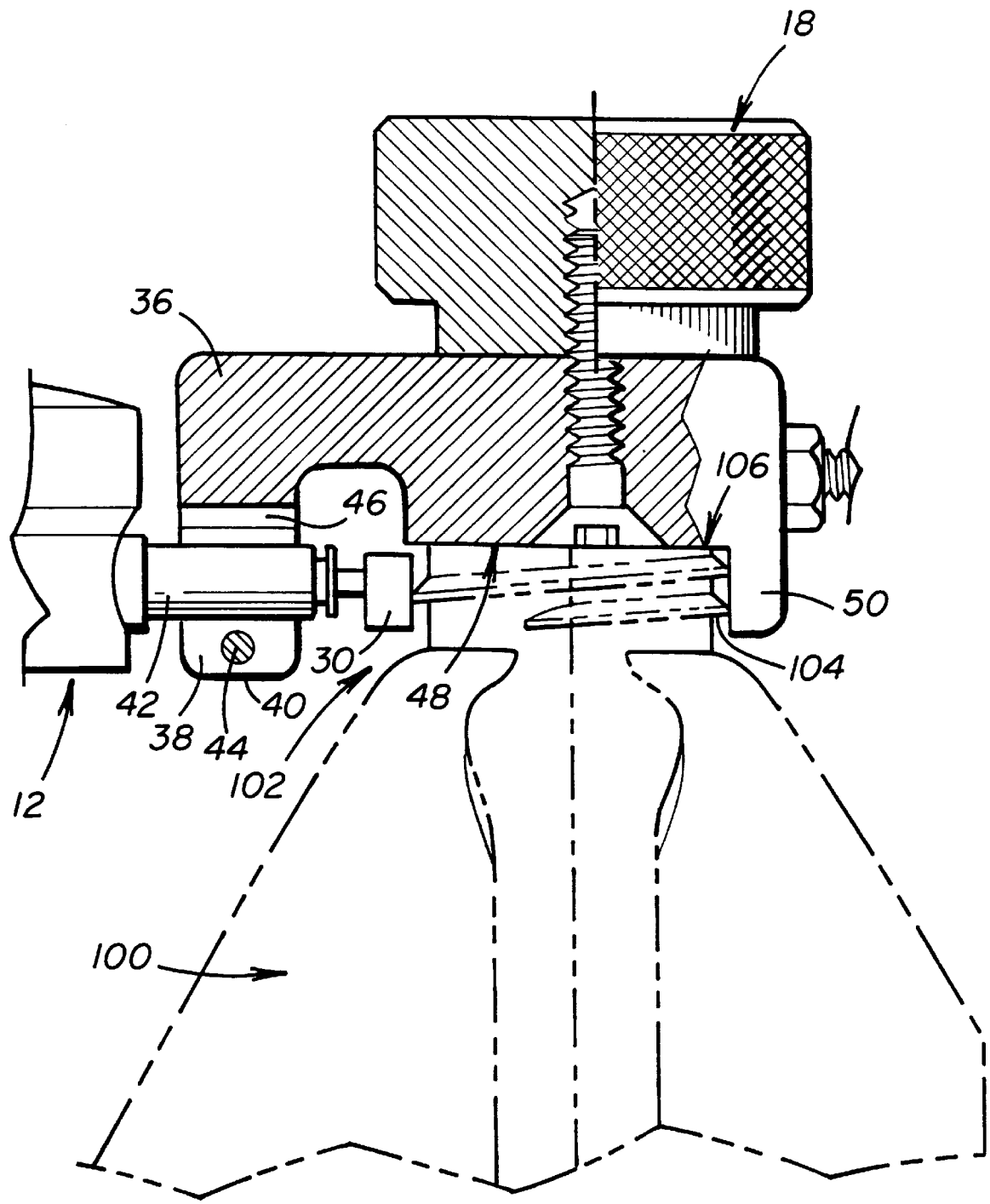
FIG. 11 is a side view, partially in cross-section, of the measuring device measuring a bottle finish.

The gauge 12 is mounted onto the central portion or seat 10 of the measuring device by an L-shaped leg 36 which is formed as a part of the seat and extends from an upper portion of the seat. As best shown in FIGS. 5 and 11, the L-shaped leg 36 has a central slot 38 extending from a bottom surface 40 of the L-shaped leg to a bore 46 which is provided through the leg. A cylindrical support member 42 of the gauge 12 is inserted into the L-shaped leg 36 through a central bore which has an axis extending along a plane of the slot 38. The support member 42 of the gauge 12 is fixed in place by a screw 44 which draws the two halves of the L-shaped leg 36 on opposite sides of the central slot 38 toward each other to hold the gauge in place by friction. Other methods of securing the gauge 12 to the seat 10, such as welding, may also be used.

The bottle neck receiving seat 10 as best shown in FIGS. 4 and 5 includes a support surface 48 which is a substantially planar surface for engaging a top surface 106 of the container 100. Extending from the support surface 48 is an L-shaped wall 50 which extends along two sides of the support surface. The L-shaped wall 50 extends from the support surface 48 a sufficient distance so that the L-shaped wall will engage the threads 104 of the container 100. However, the L-shaped wall 50 is not long enough to interfere with rotation of the measuring device with respect to the container 100. The L-shape of the wall 50 provides two legs, and thus, two abutment surfaces which abut two locations on the container finish.

A movable piston 52, shown in FIG. 5 in solid lines at an extended position, and in hidden lines at a retracted position, is spring-loaded to hold the container finish 102 in the seat 10 as the measuring device is rotated on the container 100. The spring-loaded piston 52 includes a contact surface or pad 54 mounted on a piston shaft 56 which is movable within a piston cylinder 58. As shown in the cross-sectional view of FIG. 10, a spring 60 is disposed within the piston cylinder 58 and biases the piston shaft 56 having the contact pad 54 toward the extended position. Accordingly, the spring-biased piston 52 is kept in constant contact with the container finish 102 during rotation. The force applied to the container finish 102 by the spring-biased piston 52 is strong enough to hold the finish in the seat but not strong enough to distort the finish. The piston 52 may also be biased by means other than the spring 60, such as, by fluid pressure.

As shown in FIG. 5, the piston shaft 56 is positioned at an angle of approximately 45 degrees with respect to each leg of the L-shaped wall 50. The spring-loaded piston 52 moves in the direction of the arrow C, along a line which is slightly offset from the central axis of rotation X of the measuring device. This slight offset allows the pad 30 of the actuator 16 to move easily in and out without interference from the contact pad 54 of the piston 52.

The container finish 102 is held in place in the seat 10 by three point contact between two contact points on the L-shaped wall 50 and the contact pad 54 of the piston 52. This three point contact provides secure support preventing tipping of the measuring device on the container.

Figure 6:
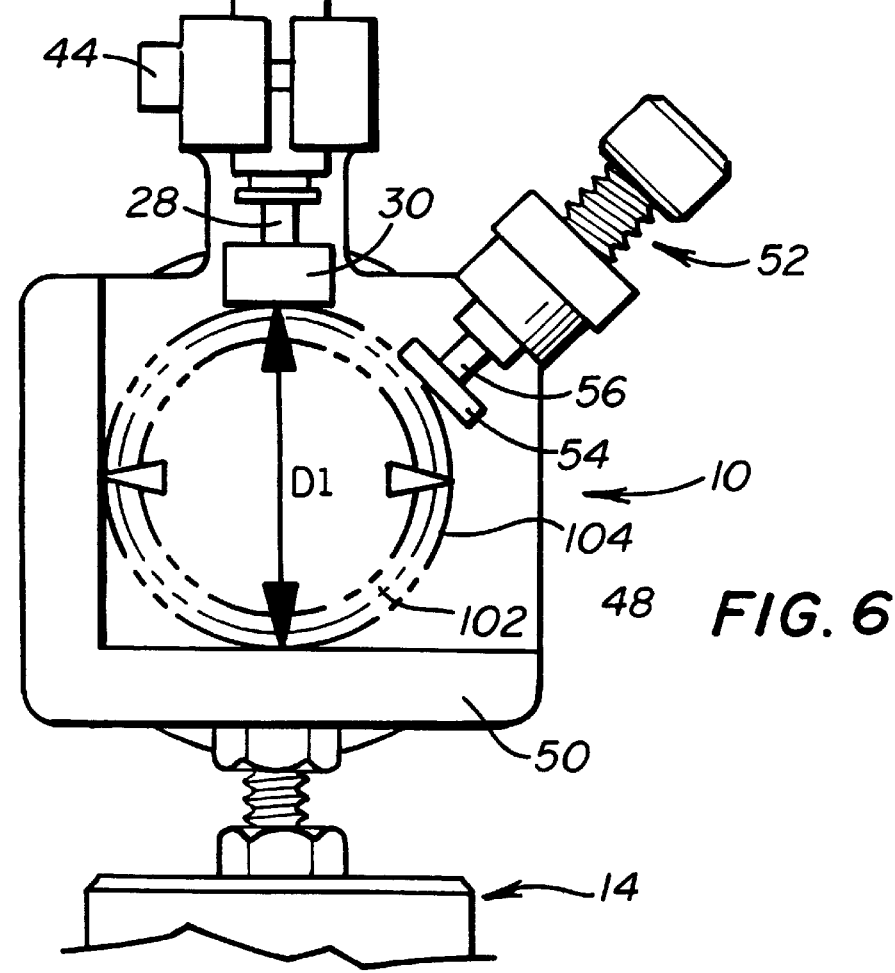
FIG. 6 is an enlarged bottom view of a portion of the measuring device illustrating the measurement of a first dimension of a bottle finish.

FIG. 6 illustrates the measurement of a first dimension D1 of a container finish 102 with the measuring device according to the present invention. As shown in the drawing, the container finish 102 is positioned in the seat 10 so that an exterior of the thread 104 abuts the L-shaped wall 50 at two contact points and abuts the contact pad 54 of the spring-loaded piston 52 at a third point. The actuator pad 30 also engages an exterior of the thread 104 at a position which is opposite one of the contact points on the L-shaped wall 50. Accordingly, the actuator 16 measures the diameter D1 of the container finish 102 at this point. The measurement of the dimension D1 is read off the digital display 20 and may be given either as a positive or negative variation from an expected dimension or calibration dimension. Alternatively, the dimension measured may be an actual diameter D1 of the finish or may be measured from some other calibration point.

The measuring device is rotated on the container 100 to measure the diameters of the container finish 102 continuously around the container. For example, FIG. 8 illustrates the measurement of a container diameter D2 at a position which is rotated 90 degrees from the measured diameter D1. Although only two measurements of the container finish are illustrated in the figures, it should be understood that the measuring device according to the present invention continuously measures the diameter of the container finish as the measuring device is rotated on the container.

Preferably the gauge 12 includes a feature which will retain and display the minimum and maximum dimensions which are measured as the device is rotated 360 degrees on the container. The gauge 12 may also calculate ovality by subtracting the minimum dimension from the maximum dimension.

FIG. 11 illustrates the measurement of the container finish 102 diameters D1 and D2 from a top surface or major outside diameter of the thread 104. It is this top surface of the thread or the T-dimension of the finish which is most important to maintain within the predetermined tolerance limits to ensure cap retention. However, it should be understood that a modified configuration of the contact surface on the L-shaped wall 50 and the pad 30 of the actuator 16 may be used to perform measurement of the E-dimension of the container finish.

One important aspect of the present invention involves the balancing of the measuring device on the top of the container 100. The balancing feature is particularly important when the measuring device is used with a non-symmetrical container because it is difficult to place a non-symmetrical container into a self supported measuring device for measurement of the finish. The counterweight 14 of the present invention allows the measuring device to be balanced on top of the container to be measured. As shown in FIG. 4, the counterweight includes a cylindrical member 64 with a knurled surface and a threaded internal bore 66. A threaded shaft 68, extends from the bottle neck receiving seat 10, and is received within the bore 66 of the counterweight 64. The threaded engagement between the shaft 68 and the counterweight 64 allows the position of the counterweight to be adjusted with respect to the bottle neck receiving seat 10 by rotation of the counterweight. A nut 70 or other fastening means is provided which is used to lock the counterweight 64 in place after it has been properly positioned on the threaded shaft 68. A second nut 72 or other fastening means is positioned adjacent the seat 10 and locks the threaded shaft 68 in place. Other methods of adjusting the counterweight may also be used without departing from the invention.

As illustrated in FIGS. 6 and 8, the gauge 12 measures the diameters D1 and D2 across a center of the bottle finish. In order to center bottle finishes of different sizes in the bottle neck receiving seat 10, a series of centering members 84, 86, as illustrated in FIG. 12, of different thicknesses are provided for centering these different bottle sizes. Each of the centering members 84, 86 are L-shaped and have a different thickness to accommodate different bottle sizes. The centering members 84, 86 include threaded bores 88 which are aligned with corresponding bores (not shown) extending through the L-shaped wall 50 of the seat 10. Two screws 92 are passed through the bores in the L-shaped wall 50 and threaded into one of the centering members 84, 86 to hold the member in place. The centering members 84, 86 allow the measuring device to be used with different size finishes 102 and maintain alignment of the actuator shaft 28 and the central axis X (FIG. 4) of the seat 10, with a central axis of the finish.

A calibration of the measurement device is illustrated in FIG. 13. The calibration step involves placing a calibration block 76, shown in FIG. 14, into the seat 10 of the measurement device. The block 76 is positioned in the seat 10 such that one wall 78 of the block abuts a bottom one of the legs of the L-shaped wall 50 and a second wall 80 of the block is engaged by the actuator pad 30. A set button 22, shown in FIGS. 1 and 2, of the gauge is then manually depressed to calibrate or set the gauge at a particular dimension. Preferably, the calibration block 76 is configured to have a calibration dimension H which is equal to one inch or multiples thereof. Therefore, as the measuring device is rotated on the container finish 102, the minimum and maximum values displayed on the digital display 20 of the gauge 12 will be the actual T-dimensions. For example, a plastic container having a 38 mm expected finish diameter will preferably be within ±0.012 inches (±0.3048 mm) of the nominal finish diameter.

As shown in FIG. 13, the gauge 12 is provided with a computer connection socket 82 which receives a plug for connection to a computer. The socket 82 allows the gauge to be connected to a computer so that the minimum and maximum diameters and ovality can be automatically recorded by the computer. This automatic recordation of the measured data by computer prevents the possibility of human error in recording the measurement data and also allows for a statistical analysis of the data.

Figure 15:
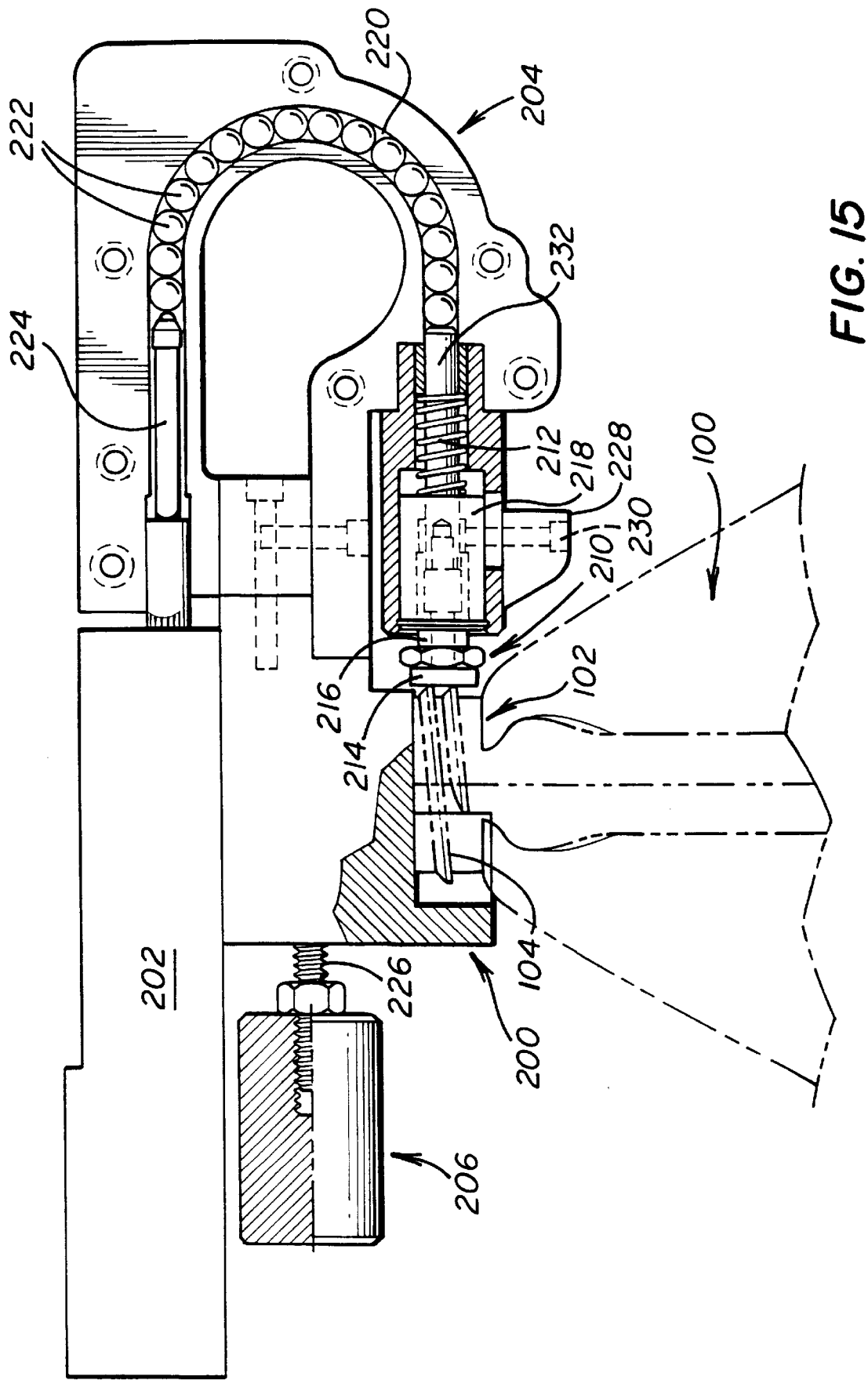
FIG. 15 is a side view, partly in cross-section, of a measuring device according to an alternative embodiment of the invention.
Figure 16:
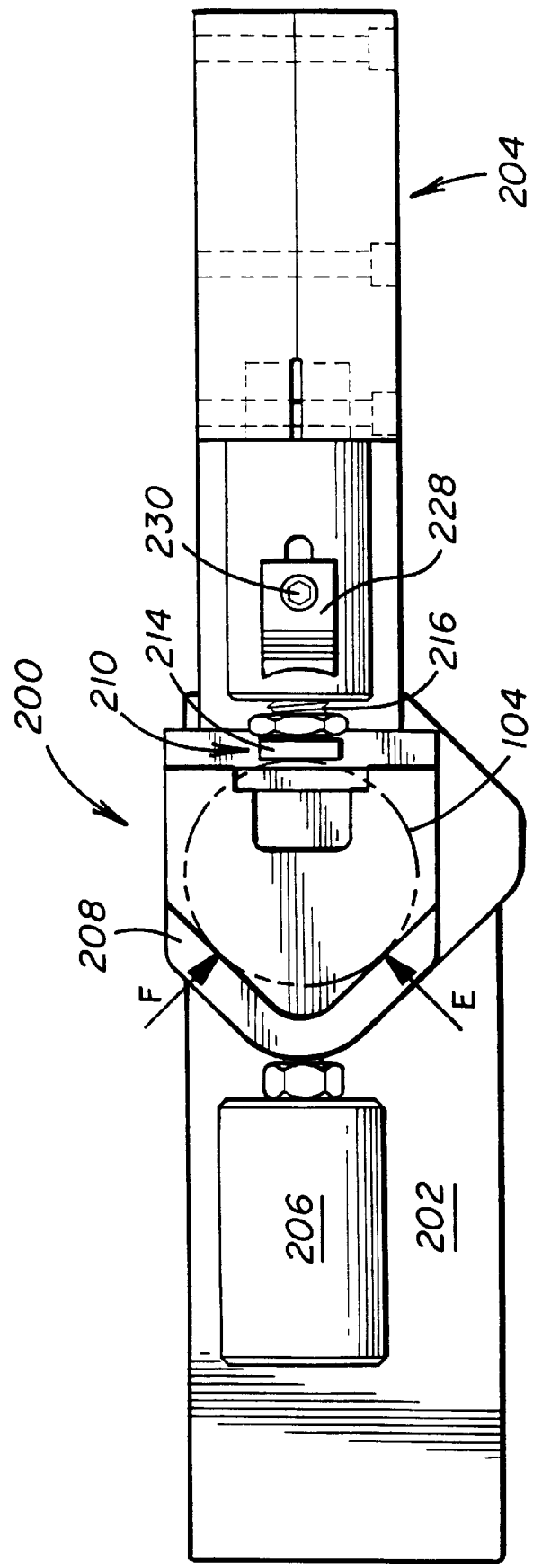
FIG. 16 is a bottom view of the measuring device of FIG. 15.

An alternative embodiment of the invention is illustrated in the side view of FIG. 15 and the bottom view of FIG. 16. The measurement device includes a bottle neck receiving seat 200, a gauge 202, and a motion transmitting mechanism 204. In order that the measuring device of FIG. 15 will balance on the container finish 102, a counterweight 206 is positioned below the gauge 202. The counterweight 206 is mounted on a threaded shaft 226 to allow adjustment of the counterweight position in a manner similar to that of the counterweight of the embodiment of FIG. 1.

As shown in FIG. 16, the bottle neck receiving seat 200 includes an L-shaped wall 208 for abutting the container finish at two locations indicated by the arrows E and F. A spring-loaded indicator 210 abuts a side of the thread 104 and moves in and out as the measuring device is rotated on the container 100. The indicator 210 is biased toward the L-shaped wall 208 by an internal spring 212. The indicator 210 is also adjustable by rotating an indicator pad 214 which is mounted on a threaded shaft 216 in a sleeve 218 to adjust the at rest position of the indicator pad.

The measuring device of FIGS. 15 and 16 differs from the measuring device of FIG. 1 in that the indicator 210 is arranged at an angle of substantially 45 degrees with respect to the two legs of the L-shaped wall 208. This arrangement eliminates the need for an additional contact surface to retain the container finish within the seat 200. Accordingly, a three point contact is provided by the two contact points on the L-shaped wall 208 and by the pad 214.

A second end 232 of the indicator 210 is positioned adjacent a curved channel 220 formed in the motion transmitting mechanism 204 and containing a plurality of bearings 222. The bearings 222 transmit the motion of the second end 232 of the indicator 210 to a movable actuator 224 of the gauge 202. The ball bearings 222 fill the channel 220 along its length and provide a play-free transmission of motion. The indicator 210 also includes a trigger 228 connected to the indicator sleeve 218 by a pin 230. The trigger 228 is used to manually retract the indicator 210 against the bias of the spring 212 so that the container finish 102 can be inserted into the bottle neck receiving seat 200 for measurement.

The measuring device of FIGS. 15 and 16 also differs from that of FIG. 1 in that the gauge 202 is placed above the seat 200 rather than extending from a side of the seat. This arrangement of the gauge 202 helps to balance the measuring device and allows the device to be more compact.

Figure 17:
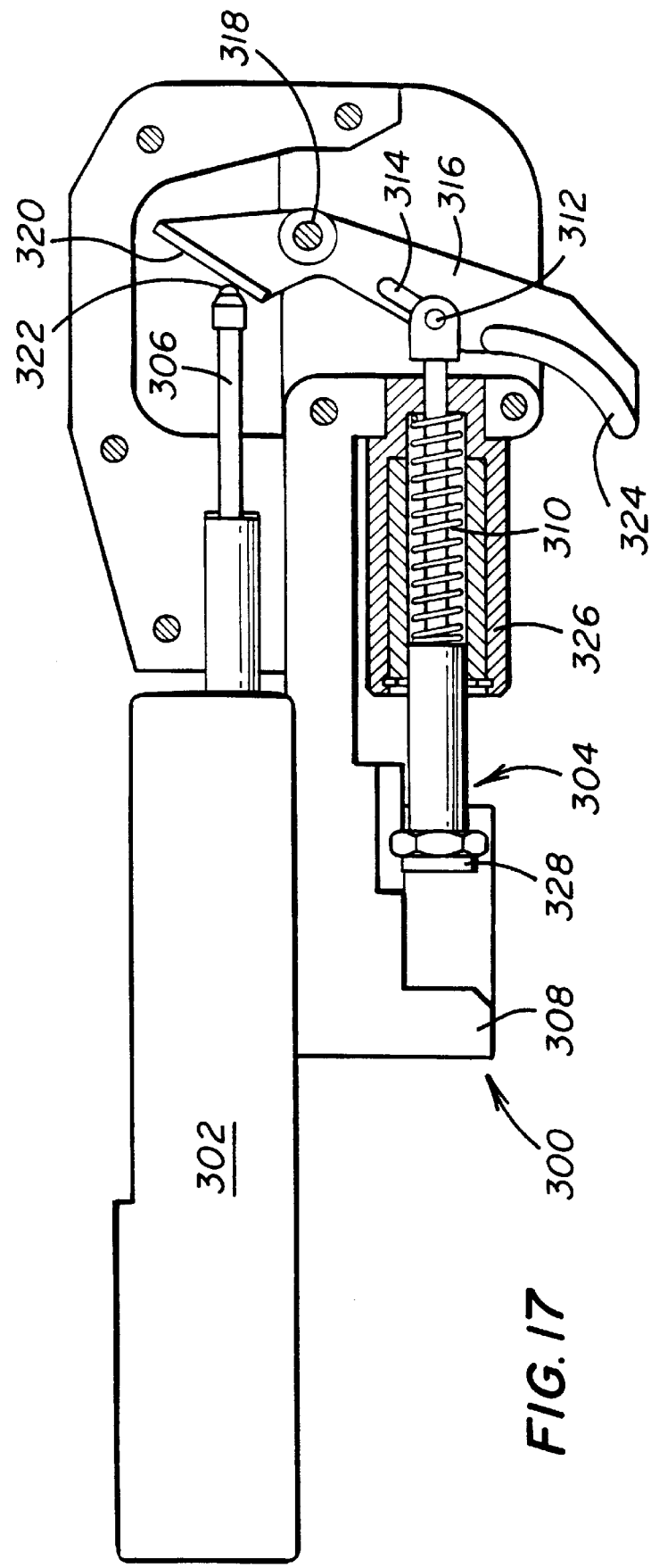
FIG. 17 is a side view, partially in cross-section, of another alternative embodiment of the measuring device in an unengaged position.
Figure 18:
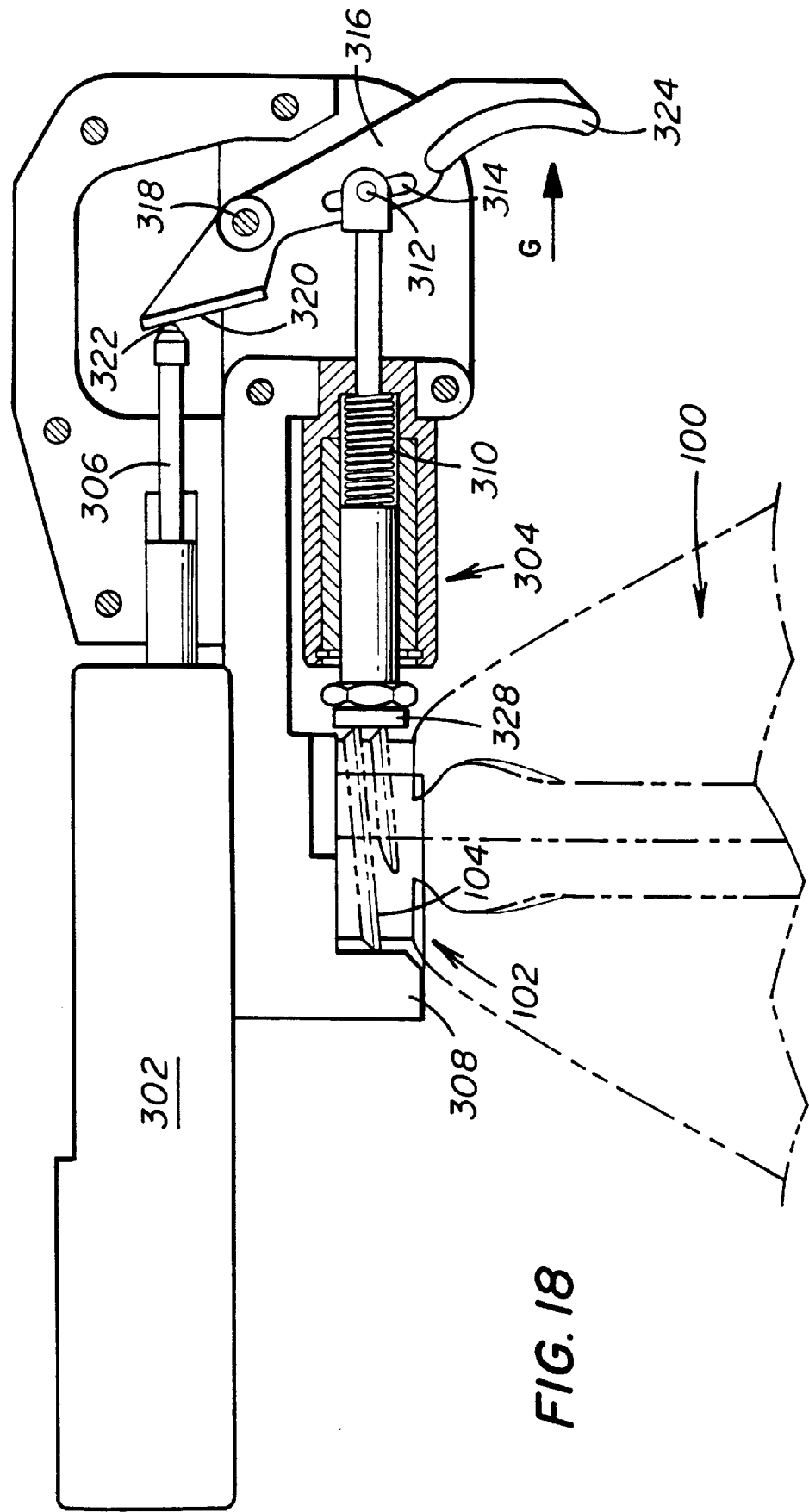
FIG. 18 is a side view, partially in cross-section, of the measuring device of FIG. 17 mounted on a container finish.

Another alternative embodiment of the measuring device according to the present invention, as shown in FIGS. 17 and 18, employs a mechanical linkage to transmit motion from an indicator 304 to an actuator 306 of a gauge 302. A bottle neck receiving seat 300 of the measuring device of FIG. 17 is substantially similar to that shown in the embodiment of FIGS. 15 and 16, and includes and L-shaped wall 308 for abutting a container finish at first and second points. The indicator 304 is biased toward the L-shaped wall 308 by a spring 310 which is contained inside a sleeve 326 of the indicator.

A second end of the indicator 304 is connected to a link member 316 by a pin 312 passing through a slot 314 of the link member. The link member 316 pivots about a pivot point 318 and transmits the motion of the indicator 304 to the actuator 306 of the gauge as the measuring device is rotated on a container finish. A pad 320 on a first end of the link member 316 engages a rounded end 322 of the actuator 306 to transmit motion of the link to the actuator.

In order to place the measuring device of FIG. 17 on a bottle finish 102 as shown in FIG. 18, a trigger 324 is pulled in a direction indicated by the arrow G. Movement of the trigger 324 in the direction of the arrow G causes the indicator 304 to move away from the L-shaped wall 308 so that the measuring device may be placed on the container finish 102 with the indicator pad 328 abutting an outside surface of the threads 104 as shown in FIG. 18.

The embodiment of FIGS. 17 and 18 having the mechanical linkage is arranged so that the measuring device will be balanced when placed on a container 100. The measuring device, when balanced, can be easily rotated to measure the minimum and maximum diameters of the container finish. The materials for the measuring device may be arranged so that the device is balanced without the need for an additional counterweight. Alternatively, a counterweight such as those shown in the embodiments of FIG. 1 or FIG. 15 may be used.

The measurement device according to the various embodiments of the present invention includes a plurality of contact surfaces which are capable of sliding along the container finish 102 during measurement. These contact surfaces include the support surface 48, the L-shaped wall 50, and the pads 30, 54. The contact surfaces are preferably formed of a material with a low friction coefficient so that the measuring device rotates easily on the container finish 102. Examples of suitable materials include plastic, stainless steel, other metal alloys, and materials coated with a coating such as a Teflon coating.

Although the operation of the present invention has been described as involving the rotation of the measuring device 360 degrees around the bottle finish, it should be understood that a 180 degree rotation should be sufficient to result in measurement of the entire finish and an accurate calculation of ovality. However, rotation of 360 degrees, or even 720 degrees may also be used, in which case each measurement across the finish is conducted more than one time.

The accuracy of the container measuring device according to the present invention is at least two times greater than the accuracy achieved when measurements are made manually with a caliper. In order to determine the increase in accuracy, containers were measured by an optical comparator, a caliper, and the present invention with the following results.

EXAMPLE

The optical comparator data is considered the most accurate and was used as the standard to which the caliper measurement method and the measurements taken by the present invention were compared. A bias was determined by comparing the actual minor T and major T dimensions of the container finish as measured by the optical comparator with the values measured by the caliper and the present invention.

The bias for the caliper method was between 0.0064 mm and 0.0079 mm (with a mean of 0.0071 mm) for the minor T dimension, and between 0.0062 mm and 0.0072 mm (with a mean of 0.0067 mm) for the major T dimension. Accordingly, the bias of the caliper method varied between approximately ±0.006 mm and ±0.008 mm.

The bias for the present invention was between 0.0013 mm and 0.0028 mm (with a mean of 0.002 mm) for the minor T dimension, and between 0.0021 mm and 0.0032 mm (with a mean of 0.0027 mm) for the major T dimension. Thus, the bias of the present invention varied between approximately ±0.001 mm and ±0.003 mm.

The advantages of the above-described measuring devices include the ability to quickly and accurately measure the ovality of a container finish. In addition, the present invention is portable and adaptable to container finishes of different diameters. The present invention also provides a computer output which allows the data collected by the measuring device to be directly inputted to a computer. This avoids possible human error in recording the data and allows statistical analysis of the data. Further, the present invention provides an easily reproducible measurement which will have minimal variation from one user to another.

The measuring device according to the present invention can be used to measure container finishes of different sizes. For example, 38 mm, 33 mm, and 28 mm finishes can be measured with the same device. Finally, the measuring device according to the present invention measures a true minimum and maximum diameter of the container finish and retains this information and calculates the ovality.

The above-described exemplary embodiments of the present invention are intended to be illustrative in all respects, rather than restrictive. The present invention is capable of many variations in detailed implementation that can be derived from the description contained herein by a person skilled in the art. All such variations and modifications are considered to be within the scope and spirit of the present invention, as defined by the following claims.

What is claimed is:

1. A container finish measuring device comprising:
    a seat receivable on a container finish, the seat including a support surface, two fixed contact surfaces, and a movable contact surface;
    a gauge connected to the movable contact surface for determining a minimum diameter and a maximum diameter of the container finish depending on motion of the movable contact surface;
    a counterweight connected to the seat, the counterweight arranged to balance a weight of the container finish measuring device on the container finish and allow rotation of the measuring device on the finish to measure the minimum diameter and the maximum diameter.

2. The container finish measuring device according to claim 1, wherein the minimum diameter and the maximum diameter of the container finish determined by the gauge are T-dimension minimum and maximum dimensions.

3. The container finish measuring device according to claim 1, wherein the gauge determines ovality based on the minimum diameter and the maximum diameter.

4. The container finish measuring device according to claim 1, wherein the support surface is a substantially planar surface for engaging a top rim of the container finish, and the two fixed contact surfaces and the movable contact surface engage threads of the container finish.

5. The container finish measuring device according to claim 4, wherein the two fixed contact surfaces and the movable contact surface are substantially perpendicular to the support surface.

6. The container finish measuring device according to claim 1, further comprising a spring loaded piston for holding the container finish in contact with the two fixed contact surfaces as the measuring device is rotated on a container.

7. The container finish measuring device according to claim 1, wherein the movable contact surface is located on a first end of a spring loaded actuator pin.

8. The container finish measuring device according to claim 1, wherein motion of the movable contact surface is transmitted by a plurality of bearings to the gauge.

9. The container finish measuring device according to claim 1, wherein the motion of the movable contact surface is transmitted by a mechanical linkage to the gauge.

10. The container finish measuring device according to claim 7, wherein motion of a second end of the actuator pin is measured by the gauge which determines the minimum diameter, the maximum diameter, and the ovality of the finish.

11. The container finish measuring device according to claim 1, wherein the counterweight is adjustable to balance the measuring device on the container finish.

12. The container finish measuring device according to claim 1, wherein the gauge includes a data output port, and the minimum diameter and maximum diameter, and an ovality are recorded by a computer connected to the data output port.

13. A bottle neck measuring device for measuring minimum and maximum diameters of a bottle neck to assure cap retention and a leak-proof seal between the bottle neck and a cap, the measuring device comprising:
    a gauge for measuring the minimum and maximum diameters of the bottle neck; and
    a measuring device body having the gauge attached thereto and a bottle neck receiving seat for receiving the bottle neck, the measuring device body arranged such that when the bottle neck receiving seat is positioned on the bottle neck, the measuring device body is balanced on the bottle neck and is rotatable about the bottle neck for measurement of the minimum and maximum diameters.

14. The bottle neck measuring device according to claim 13, wherein the bottle neck receiving seat includes a substantially L-shaped wall arranged to abut first and second locations on the bottle neck and a movable actuator arranged to abut a third location on the bottle neck and being connected to the gauge to measure a diameter of the bottle neck.

15. The bottle neck measuring device according to claim 13, further comprising an adjustable counterweight for adjusting a weight distribution of the measuring device to balance the measuring device on the bottle neck.

16. The bottle neck measuring device according to claim 13, wherein the bottle neck receiving seat includes adjustment means allowing the seat to receive bottle necks of different diameters.

17. The bottle neck measuring device according to claim 16, wherein the adjustment means includes a spring loaded piston and at least one centering member.

18. A method of measuring a minimum diameter and a maximum diameter of a bottle finish comprising:

balancing a measuring device on the bottle finish;

rotating the measuring device at least 180 degrees while the measuring device is balanced on the bottle finish; and reading the minimum diameter and the maximum diameter of the bottle finish from the measuring device.

19. The method of measuring according to claim 18, wherein the measuring device retains the minimum diameter and the maximum diameter which are sensed as the measuring device is rotated.

20. The method of measuring according to claim 18, wherein the minimum diameter and the maximum diameter are used to calculate an ovality of the bottle finish.

* * * * *